(12) United States Patent
Kamida et al.

(10) Patent No.: US 6,793,265 B2
(45) Date of Patent: Sep. 21, 2004

(54) SEAT ARRANGEMENT FOR VEHICLE (75) Inventors: Koji Kamida, Utsunomiya (JP); Jun Otsuki, Haga-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/424,498

(22) Filed: Apr. 25, 2003

(65) Prior Publication Data
US 2003/0218349 A1 Nov. 27, 2003

(30) Foreign Application Priority Data
May 23, 2002 (JP) .................................. P2002-149730

(51) Int. Cl.$^7$ ................................................ B60N 2/36
(52) U.S. Cl. .................... 296/64; 296/65.09; 296/66
(58) Field of Search ....................... 296/64, 66, 65.09, 296/65.16, 65.05; 297/257, 335, 15

(56) References Cited

U.S. PATENT DOCUMENTS

| | | | |
|---|---|---|---|
| 2,916,325 A | * 12/1959 | Estes et al. | .................... 296/66 |
| 4,932,709 A | * 6/1990 | Wainwright | .............. 296/65.09 |
| 5,658,046 A | * 8/1997 | Rus | ......................... 297/378.1 |
| 5,702,145 A | * 12/1997 | Fowler et al. | ................. 296/66 |
| 6,129,404 A | 10/2000 | Mattarella et al. | ........ 296/65.09 |
| 6,318,784 B2 | * 11/2001 | Nishide | .................... 296/65.09 |
| 6,338,516 B1 | * 1/2002 | Toyota et al. | ............... 296/37.2 |
| 6,406,084 B1 | * 6/2002 | de Campos et al. | .......... 296/66 |
| 6,416,107 B1 | * 7/2002 | Kanaguchi et al. | ...... 296/65.09 |
| 6,582,003 B2 | * 6/2003 | Fourrey et al. | ............... 296/64 |
| 2002/0153740 A1 | * 10/2002 | Miyahara et al. | ............. 296/64 |

FOREIGN PATENT DOCUMENTS

| | | |
|---|---|---|
| EP | 1 211 128 | 5/2002 |
| GB | 2 380 933 | 4/2003 |
| JP | 2-28986 | 8/1990 |
| JP | 2001-0055067 | 2/2001 |
| JP | 2002-67760 | 3/2002 |

* cited by examiner

*Primary Examiner*—Stephen Gordon
(74) *Attorney, Agent, or Firm*—Merchant & Gould P.C.

(57) ABSTRACT

A seat arrangement for a vehicle comprises a floor having a first section, a second section, and a third section, arranged one behind another while rising stepwise from another section in front, a first row seat disposed on the first section of the floor, a second row seat which is disposed on the second section of the floor in use, and which is foldable forward so as to be in substantially a level state, a third row seat which is disposed on the third section of the floor in use, and which is rotatable backward along with an associated seat base so as to be in substantially in a level state. A luggage compartment having a flat bottom is formed when the second row seat is folded, and the third row seat is rotated backward.

4 Claims, 6 Drawing Sheets

SEAT ARRANGEMENT FOR VEHICLE

BACKGROUND OF THE INVENTION

1. Field of the Invention

The present invention relates to a seat arrangement for a vehicle, and in particular, the present invention relates to a seat arrangement for a vehicle, which enables forming a compartment having a flat bottom when the seats are in a folded state, while on the other hand, providing seating so that all passengers are facing forward with a forward view when the seats are deployed.

2. Description of the Related Art

As disclosed in Japanese Published Utility Model No. Hei 02-28986, and in Japanese Unexamined Patent Application, First Publication No. 2002-67760, a seat arrangement for a vehicle is known, in which seats are arranged to be stowed for enlarging usable space in the vehicle. In such a vehicle, room for luggage may be enlarged by folding and stowing open seats among the seats therein when only a few passengers are in the vehicle and a large amount of luggage must be loaded.

In recent years, minivan type or wagon type vehicles, which have three rows of seats for easily seating a number of passengers therein, have become popular on the market, and seat arrangements, in which seats are made foldable so that luggage may be conveniently loaded therein, have been proposed for such vehicles as well.

In such conventional vehicles having three rows of seats, a problem is encountered in that it is difficult to ensure spaces for accommodating second and third row seats in folded states because each of the three rows of seats is arranged one behind another. On the other hand, in such vehicles, another problem is also encountered in that the forward view for a passenger seated in the second or third row seat is easily blocked because each of the three rows of seats is arranged one behind another.

SUMMARY OF THE INVENTION

In consideration of the above circumstances, an object of the present invention is to provide a seat arrangement for a vehicle, in which seats are arranged so as to be easily stowed, while on the other hand, forward views for passengers seated in the seats are ensured so that visibilities and comfort of the passengers are improved.

In order to achieve the above object, the present invention provides a seat arrangement for a vehicle comprising: a floor having a first section, a second section, and a third section, each of which is arranged one behind another while rising stepwise from the section in front; a first row seat disposed on the first section of the floor; a second row seat which is disposed on the second section of the floor in use, and which includes a seat base that is raiseable and movable forward and a seatback that is foldable forward so as to be in substantially a level state; a third row seat which is disposed on the third section of the floor in use, and which includes a seat base and a seatback that is foldable onto the associated seat base, and that is rotatable backward along with the associated seat base so as to be in substantially a level state, wherein a luggage compartment is formed in a state in which the seatback of the second row seat is folded forward, and the seat base of the third row seat is rotated backward, whose bottom is substantially flat while extending from a place behind the first row seat to the back end of the third row seat in a rotated state.

According to the above seat arrangement of the present invention, the luggage compartment having the flat bottom, which enables ease of loading, is ensured by folding the second row seat and by stowing the third row seat, while on the other hand, when the seats are used, forward, wide views for passengers seated, specifically, in the second and third row seats may be ensured so that visibilities and comfort of the passengers are improved due to the floor rising in steps.

In the above seat arrangement, the bottom of the luggage compartment may include the seatback of the second row seat in a folded state and the seat base of the third row seat in the rotated state.

According to the above seat arrangement, the luggage compartment can be ensured whose bottom is made flat while extending from a place behind the first row seat to the back end of the third row seat in a rotated and level state.

In the above seat arrangement, the dimensions of steps included in the floor may be determined such that a forward view for a passenger seated in one of the second and third row seats is not blocked by another passenger who is of the same height, and who is seated in another of the first and second row seats.

According to the above seat arrangement, when the seats are used, forward views for passengers seated, specifically, in the second and third row seats may not be blocked by other passengers seated in front so that visibilities and comfort of the passengers can be improved.

In the above seat arrangement, the seat base of the second row seats may be made separable from the seatback thereof, and may be made movable to a place right behind the seatback of the first row seat.

According to the above seat arrangement, the size of the luggage compartment may be maximized.

DESCRIPTION OF THE PREFERRED EMBODIMENTS

An embodiment of the present invention will be explained below with reference to the appended drawings.

Figure 1:
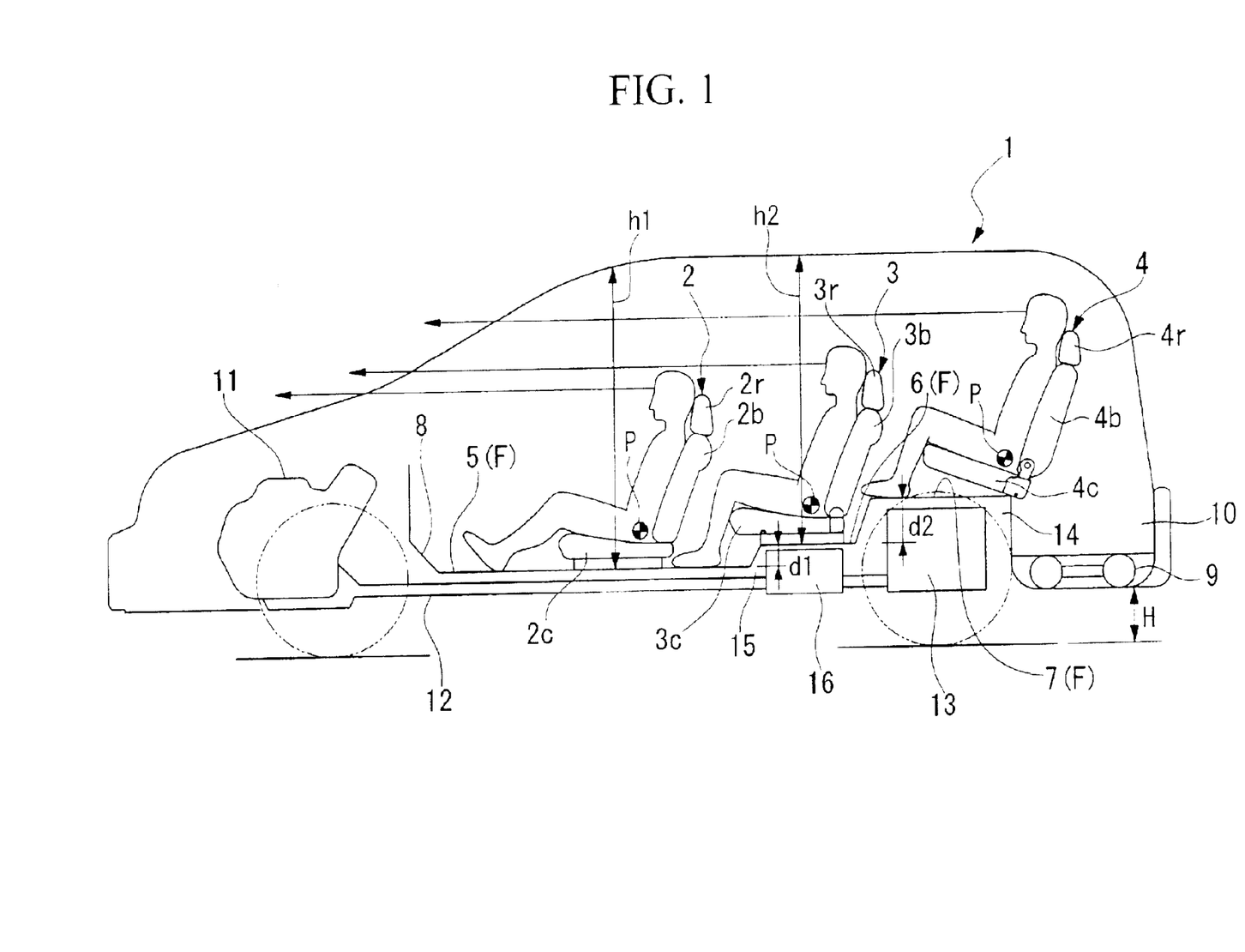
FIG. 1 is an explanatory side view showing a vehicle of an embodiment in a state in which seats thereof are used.
Figure 2:
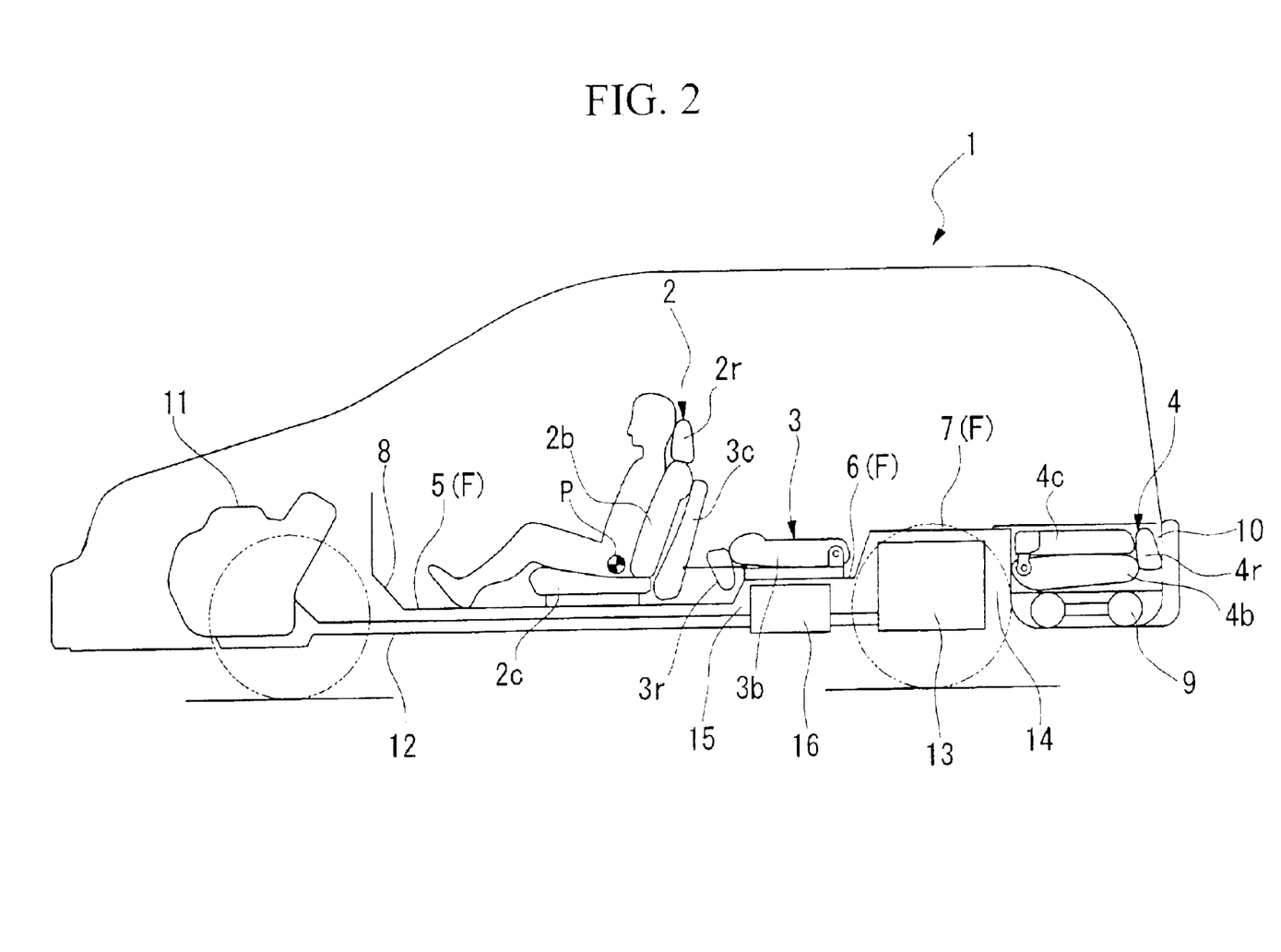
FIG. 2 is an explanatory side view showing the vehicle of the embodiment in a state in which the seats are stowed.

In FIGS. 1 and 2, reference symbol 1 shows a vehicle having a two-box style. The vehicle 1 has a seat arrangement in which first row seats 2, second row seats 3, and a third row seats 4 are arranged one behind another on a floor F from the front to the back of the vehicle 1.

More specifically, a first floor section 5, on which the first seats 2 are placed, is connected to a second floor section 6 which is positioned higher than the first floor section 5 by a step d1, and on which the second row seats 3 are placed. The second floor section 6 is connected to a third floor section 7 which is positioned higher than the second floor section 6 by a step d2, and on which the third row seat 4 is placed. The front end of the first floor section 5 is connected to the lower end of a dashboard 8. The back end of the third floor section 7 is connected to a concave portion 10 for storing a spare tire 9, which is formed in the back of the compartment in a concave shape.

Accordingly, the floor F is formed such that the first floor section 5, the second floor section 6, and the third floor section 7 are arranged one behind another while rising stepwise from the floor section in front. The dimensions of the steps d1 and d2 are determined such that a forward view for a passenger seated in one of the second and third row seats 3 and 4 is not blocked by the head of another passenger who is of the same height, and who is seated in another of the first and second row seats 2 and 3. In FIGS. 1 and 2, reference symbol P indicates a hip point.

An engine 11 is mounted in the front portion of the vehicle 1, to which a propeller shaft 12 is connected. A differential gear box 13 connected to the back end of the propeller shaft 12 is disposed in a space 14 under the third floor 7. Moreover, a fuel tank 16 is disposed in a space 15 under the second floor 6. The bottom of the fuel tank 16, the bottom of the differential gear box 13, and the bottom of the concave portion 10 are positioned at substantially the same heights.

Accordingly, a sufficient ground clearance H is ensured, which is determined by the bottoms of the fuel tank 16, of the differential gear box 13, and of the concave portion 10, while on the other hand, a space above the first floor section 5 (height h1) and a space above the second floor section 6 (height h2) are sufficiently ensured.

Figure 3:
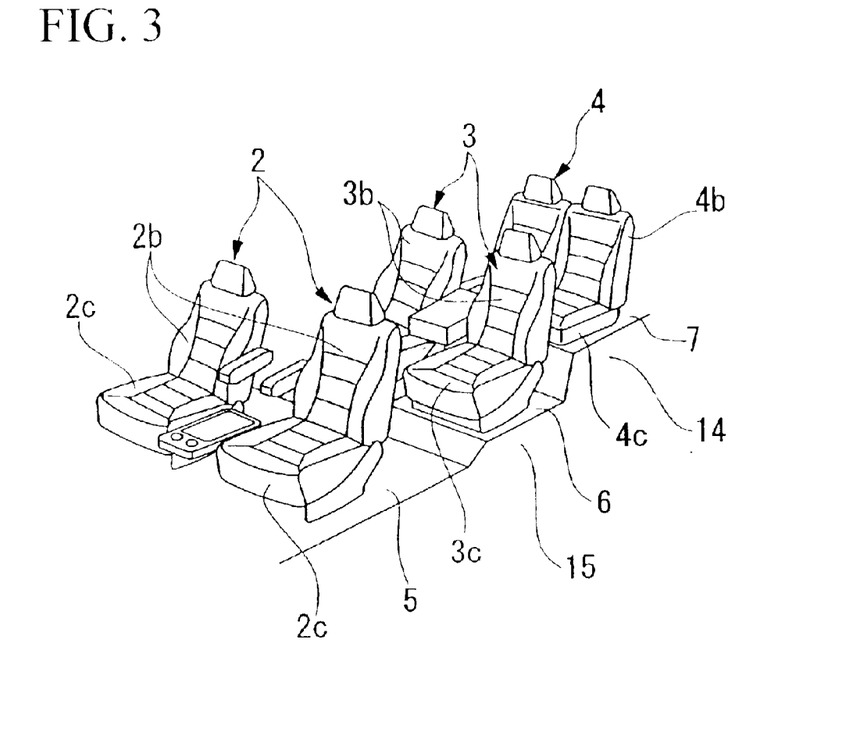
FIG. 3 is a perspective view showing the seats in a state corresponding to FIG. 1 as viewed from forward of the compartment of the vehicle.

As shown in FIG. 3, the first, second, and third row seats 2, 3, and 4 comprise seat bases 2c, 3c, and 4c, and foldable seat backs 2b, 3b, and 4b, respectively. The first and second row seats 2 and 3 comprise separate seats disposed side by side, respectively. The third row seat 4 is a so-called bench seat. The seat backs 2b, 3b, and 4b of the first, second, and third row seats 2, 3, and 4 are provided with headrests 2r, 3r, and 4r, respectively.

Each of the second row seats 3 comprises the seat base 3c, which is made raiseable and movable forward, and the seatback 3b which is made foldable forward so as to be in substantially a level state.

Figure 5:
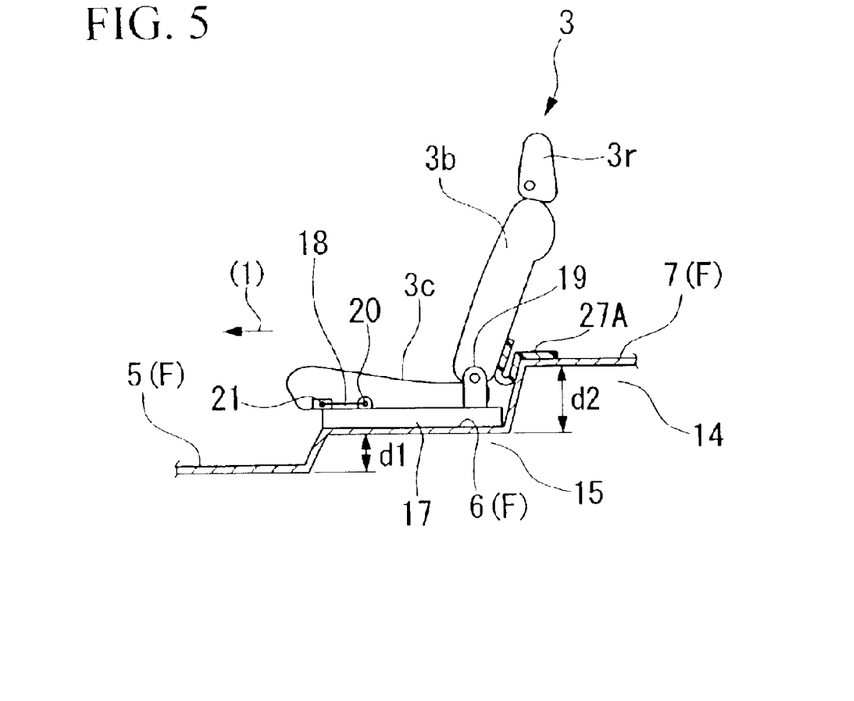
FIG. 5 is a side view showing a second row seat.
Figure 6:
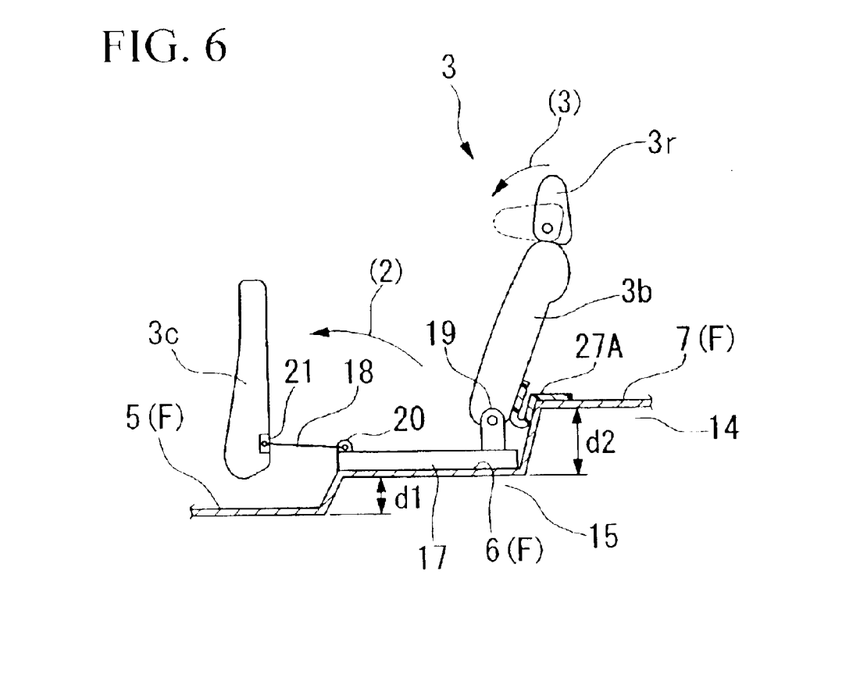
FIG. 6 is a side view showing the second row seat in the process of being stowed.
Figure 7:
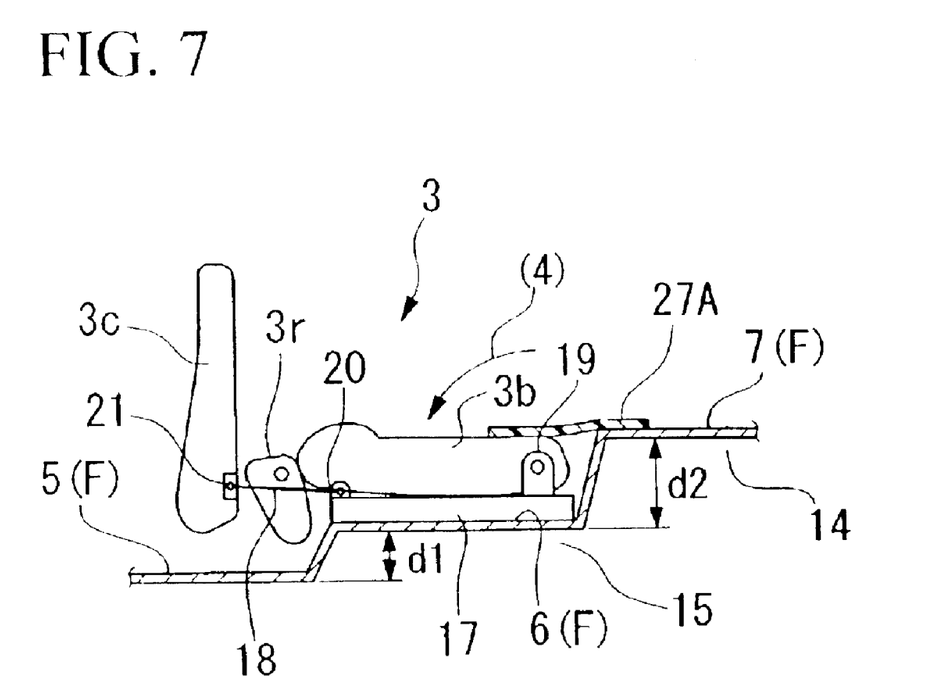
FIG. 7 is a side view showing the second row seat at completion of the process of being stowed.

More specifically, as shown in FIGS. 5 to 7, each of the second row seats 3 is provided with a pair of slide rails 17 extending in the second floor 6 in the longitudinal direction of the vehicle 1. A link 18 is supported at the proximal end thereof by the slide rail 17 in a longitudinally slidable and pivotable manner using a bracket 20, and the seat base 3c is supported at the front bottom thereof by the distal end of the link 18 in a pivotable manner using a bracket 21. The seatback 3b is supported at the lower end thereof by the back end of the slide rail 17 in a foldable manner using a hinge bracket 19. The headrest 3r is supported by the upper end of the seatback 3b in a forwardly tiltable manner. Reference symbol 27A indicates a mat which is connected, at one end thereof, to the lower end of the seatback 3b of the second row seat 3, and is connected, at the other end thereof, to the third floor section 7.

Accordingly, the second row seat 3 can be stowed through the steps of sliding the seat base 3c to the front (as indicated by the arrow (1) in FIG. 5), raising and moving forward the seat base 3c while rotating the link 18 (as indicated by the arrow (2) in FIG. 6), and pivoting forward the seatback 3b about the hinge bracket 19 (as indicated by the arrow (4) in FIG. 7) while tilting forward the headrest 3r (as indicated by the arrow (3) in FIG. 6). As a result, as shown in FIG. 7, the headrest 3r provided on the seatback 3b is accommodated between the pair of links 18, and the back face of the seatback 3b and the third floor section 7 are substantially disposed in a plane. In this state, the seatback 3b and the third floor section 7 are connected to each other by the mat 27A in substantially a flat state. The total of the height of the slide rail 17 and the thickness of the seatback 3b is substantially equal to the dimension of the step d2.

In the state shown in FIG. 7, even though the front of the seat base 3c and the tip portion of the headrest 3r are projected from the second floor section 6, these projecting portions are accommodated in the step d1 formed between the first floor section 5 and the second floor section 6; therefore, folding processes and properties of the seatback 3b are not affected by these projecting portions.

The third row seat 4 is a bench seat comprising the seat base 4c and the seatback 4b that is foldable onto the seat base 4c, and that is rotatable backward along with the seat base 4c so as to be accommodated in the concave portion 10 for the spare tire 9 along with the seat base 4c in substantially a level state.

Figure 8:
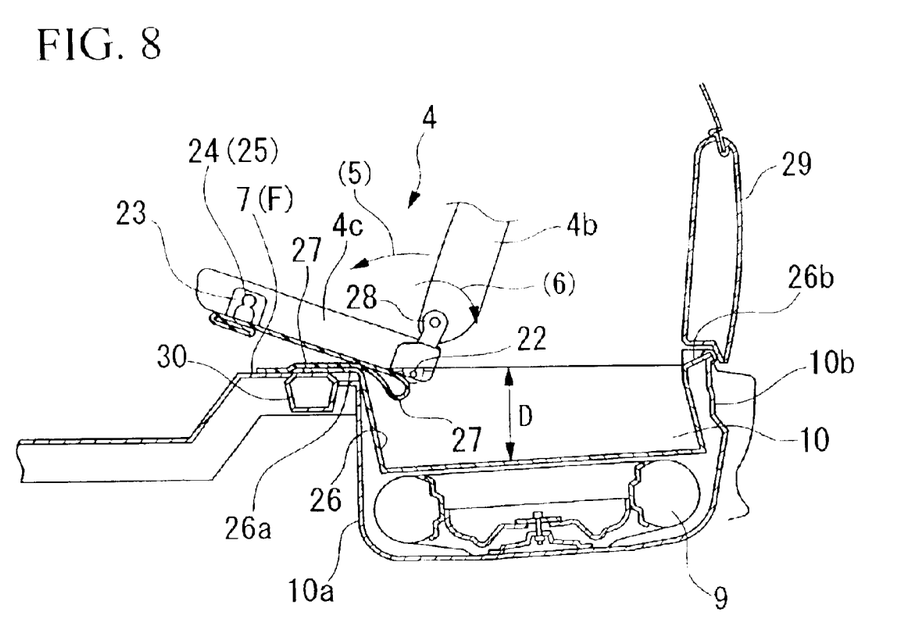
FIG. 8 is a side view showing a portion of a third row seat in the process of being stowed.
Figure 9:
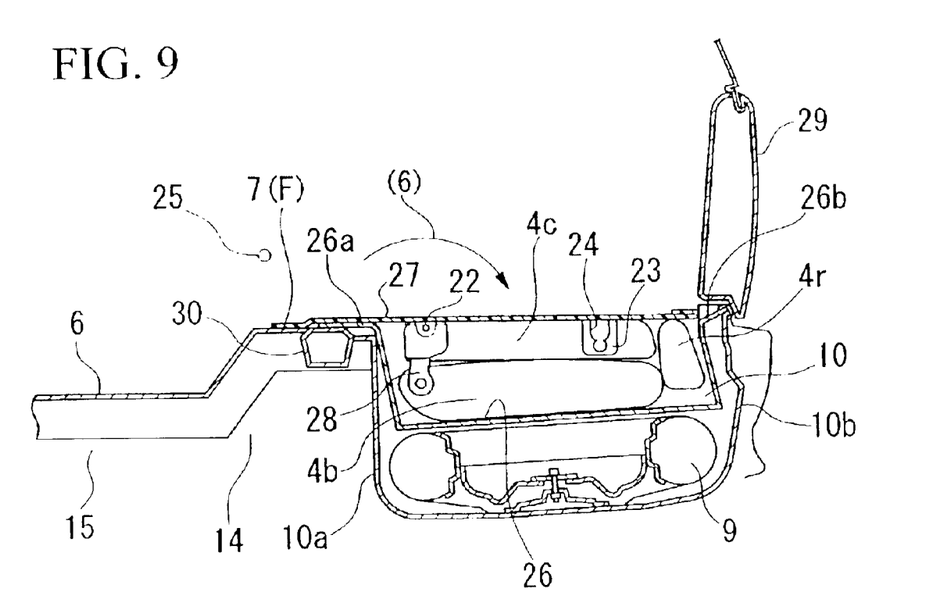
FIG. 9 is a side view showing the third row seat at completion of the process of being stowed.

More specifically, as shown in FIGS. 8 and 9, the seat base 4c of the third row seat 4 is provided with horizontally projecting support shafts 22 on the side faces and in the back portion thereof. The seat base 4c of the third row seat 4 is pivotably supported by the side walls (not shown) of the vehicle 1 using the support shafts 22. Moreover, the seat base 4c of the third row seat 4 is provided with engagement brackets 23, which open downward, on the side faces and in the front portion thereof. The third row seat 4 is prevented from being pivoted forward and backward by engaging engagement pins 25 projecting from the side walls (not shown) of the vehicle 1 with engagement portions of the engagement brackets 23.

On the bottom wall of the concave portion 10, there are placed the spare tire 9 and tools (not shown), and a partition sheet 26 is provided so as to cover the upper face of the spare tire 9. The front end 26a of the partition sheet 26 extends from the front wall 10a of the concave portion 10, and is fixed to the third floor section 7. The back end 26b of the partition sheet 26 extends along the back wall 10b of the concave portion 10, and is fixed to the upper end of the back wall 10b. In FIGS. 8 and 9, reference symbol 30 indicates a cross member fixed to the underside of the third floor section 7.

In addition, a mat 27 is provided on the underside of the seat base 4c so as to extend from the front portion to the back portion of the seat base 4c. The mat 27 is folded at the back end of the seat base 4c, and the remaining portion of the mat 27 extends so as to be sandwiched between the partition sheet 26 disposed on the third floor section 7 and the mat 27 itself disposed under the seat base 4c, and is fixed to the third floor section 7. The seatback 3b of the third row seat 4 is supported at the lower end thereof by the back end of the seat base 4c in a foldable manner using a hinge bracket 28. The headrest 4r is supported by the upper end of the seatback 4b in a forwardly tiltable manner.

Accordingly, the third row seat 4 can be stowed through the steps of folding forward the seatback 4b about the hinge bracket 28 (as indicated by the arrow (5) in FIG. 8), disengaging the engagement pins 25 projecting from the side walls from the engagement brackets 23 of the seat base 4c, and pivoting backward the seat base 4c and the seatback 4b about the support shaft 22 (indicated by the arrow (6) in FIGS. 7 and 8) while tilting forward the headrest 4r (as shown in FIG. 9). As a result, as shown in FIG. 9, the back face of the seatback 4b and the third floor section 7 are substantially disposed in a level plane, and the upper opening of the concave portion 10 for the spare tire 9 is naturally closed by the mat 27 fixed to the third floor sections 7. The total thickness of the seat base 4c and seatback 4b in a folded state is substantially equal to the depth D defined between the bottom of the partition sheet 26 and the third floor section 7. In FIGS. 8 and 9, reference symbol 29 indicates a liftback rear cargo door allowing opening and closing of a port at the rear of the vehicle 1.

According to the embodiment described above, when the first row seats 2, the second row seats 3, and the third row seat 4 are not stowed as shown in FIG. 1, and when passengers who are of the same heights are seated in the first, second, and third row seats 2, 3, and 4, forward views for passengers seated in the second or third row seats 2 or 3 can be ensured because the first floor section 5, the second floor section 6, and the third floor section 7 are arranged one behind another while rising stepwise from the floor section in front; therefore, a comfortable compartment of the vehicle 1, which provides sufficient visibility, can be obtained.

In addition, because the space 15 for accommodating the fuel tank 16 is ensured under the second floor section 6, and the space 14 for accommodating the differential gear box 13 under the third floor section 7, a sufficient space above the first floor section 5 (height h1) and a sufficient space above the second floor section 6 (height h2) can be ensured without increasing the overall height of the vehicle 1.

In particular, because visibilities of passengers can be improved by determining the step d1 between the first floor section 5 and the second floor section 6, and by determining the step d2 between the second floor section 6 and the third floor section 7 such that a forward view for a passenger seated in one of the second and third row seats 3 and 4 is not blocked by the head of another passenger seated in another of the first and second row seats 2 and 3; therefore, comfortableness may be further improved.

Figure 4:
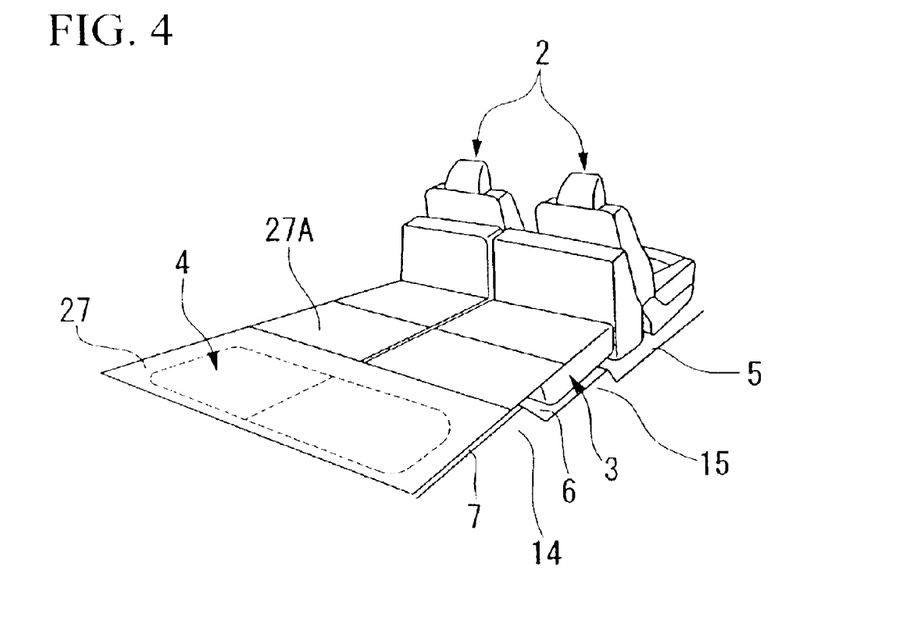
FIG. 4 is a perspective view showing the seats in a state corresponding to FIG. 2 as viewed from rearward of the compartment of the vehicle.

Furthermore, as shown in FIGS. 2 and 4, when the second row seats 3 are folded, the back face of the seatback 3b and the third floor section 7 are substantially disposed in a plane, and when the third seat 4 is accommodated under the partition sheet 26 and in the concave portion 10 for the spare tire 9, the back face of the seatback 4b and the third floor section 7 are substantially disposed in a level plane, and the concave portion 10 for the spare tire 9 is naturally closed by the mat 27 fixed to the third floor sections 7; therefore, a luggage compartment is formed whose bottom is substantially flat while extending from a place behind the first row seats 2 to the back end of the third row seat 4 in a rotated state, i.e., a broad full-flat floor is useable. The full-flat floor may be used not only for a luggage space, but also for various purposes, and thus convenience of the vehicle 1 may be enhanced.

Because the floor F is formed like stairsteps so as to rise stepwise from the front to the back, the ground height of the third floor section 7 becomes relatively high, whereby it is possible to enhance degree of freedom in arranging a rear suspension system (not shown), the fuel tank 16, and exhaust pipes (not shown), and thus a complicated suspension system, a large fuel tank, or a large muffler may be installed.

The present invention is not limited to the above embodiment. For example, as long as a flat floor extending from a place behind the first row seats 2 to the back of the compartment is formed when the second row seats 3 and the third seat 4 are folded, the second row seats 3 may be folded in other ways, and the third row seat 4 may be accommodated in other ways other than as explained above.

Advantageous Effects Obtainable by the Invention

As described above, according to the present invention, the luggage compartment having a flat bottom, which enables ease of loading, is ensured by folding the second row seat and by stowing the third row seat, while on the other hand, when the seats are used, forward, wide views for passengers seated, specifically, in the second and third row seats, may be ensured so that visibilities and comfort of the passengers are improved due to the floor formed so as to be stepped, and thus a comfortable compartment of the vehicle and ease of use of the compartment can be obtained.

Moreover, because a stepped floor is employed, the floor height of the back of the vehicle becomes relatively high, whereby it is possible to enhance degree of freedom in arranging a rear suspension system, a fuel tank, and exhaust pipes, and thus a complicated suspension system, a large fuel tank, or a large muffler may be installed.

In addition, according to the present invention, the luggage compartment can be preferably ensured whose bottom is made flat while extending from a place behind the first row seat to the back end of the third row seat in a rotated and level state; therefore, a broad and easy-to-use compartment can be obtained.

Furthermore, according to the present invention, when the seats are used, forward views for passengers seated, specifically, in the second and third row seats may not be blocked by other passengers seated in front so that visibilities and comfort of the passengers can be preferably improved.

What is claimed is:

1. A seat arrangement for a vehicle comprising:
  a floor having a first section, a second section, and a third section, each section being arranged one behind another while rising stepwise from the first section;
  a first row seat disposed on the first section of the floor;
  a second row seat which is disposed on the second section of the floor in use; and which includes a seat base that is raiseable and movable forward and a seatback that is foldable forward so as to be in substantially a level state;
  a third row seat which is disposed on the third section of the floor in use, and which includes a seat base and a seatback that is foldable onto the third row seat base, and that is rotatable backward along with the third row seat base so as to be in substantially a level state,
  wherein a luggage compartment is formed in a state in which the seatback of the second row seat is folded forward, and the seat base of the third row seat is rotated backward, and
  wherein the compartment bottom is substantially flat while extending from a place behind the first row seat to the back end of the third row seat in a rotated state.

2. A seat arrangement for a vehicle according to claim 1, wherein the bottom of the luggage compartment includes the seatback of the second row seat in a folded state and the seat base of the third row seat in the rotated state.

3. A seat arrangement for a vehicle according to claim 1, wherein the dimensions of steps included in the floor are determined such that a forward view for a passenger seated in one of the second and third row seats is not blocked by another passenger whose height is the same as that of the passenger seated in one of the second and third row seats, and who is seated in another of the first and second row seats.

4. A seat arrangement for a vehicle according to claim 1, wherein the seat base of the second row seat is separable from the seatback thereof, and is movable to a place right behind the seatback of the first row seat.

* * * * *